United States Patent [19]
Tobita et al.

[11] Patent Number: 5,554,809
[45] Date of Patent: Sep. 10, 1996

[54] PROCESS DETECTION APPARATUS

[75] Inventors: Tomoyuki Tobita, Katsuta; Yoshimi Yamamoto, Ibaraki-ken; Masao Fukunaga, Tokyo; Teruo Kobayahsi, Katsuta; Akira Nagasu, Ibaraki-ken, all of Japan

[73] Assignee: Hitachi, Ltd., Tokyo, Japan

[21] Appl. No.: 318,315

[22] Filed: Oct. 5, 1994

[30] Foreign Application Priority Data

Oct. 8, 1993 [JP] Japan .................................. 5-253387
Jul. 22, 1994 [JP] Japan .................................. 6-170670

[51] Int. Cl.⁶ .................................................... G01L 7/00
[52] U.S. Cl. ............................ 73/700; 73/756; 73/723; 345/33; 345/38; 345/55; 340/815.44
[58] Field of Search ......................... 73/700, 716, 723, 73/756; 345/33, 38, 43, 50, 55, 117; 340/815.44, 815.78, 815.79; 324/156

[56] References Cited

U.S. PATENT DOCUMENTS 3,612,851 10/1971 Fowler ................................ 324/156
3,807,232 4/1974 Wetterhorn ........................... 73/418
5,043,543 8/1991 Weehs et al. ........................ 200/82 R

FOREIGN PATENT DOCUMENTS 45532A 1/1992 Japan .

Primary Examiner—Richard Chilcot
Assistant Examiner—Paul D. Amrozowicz
Attorney, Agent, or Firm—Kenyon & Kenyon

[57] ABSTRACT

A compact pressure differential/pressure detector is a process detection apparatus for measuring a pressure, a level, a pressure differential of a process fluid. The detector is constructed of a pressure sensing block having sensors for sensing a pressure and a pressure differential, a signal processing block for processing signals from the pressure sensing block, and a terminal board block for receiving power supply from outside and transmitting signals to outside. These blocks are arranged along the same axis. Furthermore, an indicator indicating a process state is also arranged along the same axis and received in a covering case. The case is firmly attached to the pressure sensing block. The process detection apparatus permits a compact design and offers an excellent maintainability.

14 Claims, 15 Drawing Sheets

5,554,809

PROCESS DETECTION APPARATUS

BACKGROUND OF THE INVENTION

1. Field of the Invention

The present invention relates to a process detection apparatus for use in a chemical plant or the like to control fluids such as liquids and gases, which measures the pressure of a fluid, the pressure difference of fluids and the level of a fluid in a tank and is used to effect control of operation of the whole plant, and more particularly, it relates to a compact, light-weight, process detection apparatus for which it is to perform maintenance. In a process detection apparatus which outputs a signal representing the measured state of a fluid to an external equipment and has an indicator provided therein to also display the state of the fluid on the indicator, the present invention relates to an improvement that a signal to be transmitted to outside and a signal to be displayed on the indicator are converted according to a predetermined function and outputted after the conversion and the indicator indicates that these data are the ones already converted.

2. Description of Related Art

It is well known that certain operation parameters such as measuring pressure, belt speed, and flow rate in a chemical plant is indispensable to operating the plant in a safe and efficient manner. To this end, differential pressure/pressure measuring instruments have been used as a process detection apparatus. In pressure differential measurements, flow rate, density and level can be measured, while in pressure measurements, in addition to positive and negative pressures, a liquid level in a container such as a tank can also be measured. Since such differential pressure/pressure measuring instruments for the above measurements are frequently used in an explosive atmosphere which contains combustible gas or vapor of flammable material, the instruments shall be type-accepted as explosion-proof according to standards for explosion-proof electromechanical equipment. As shown in a pressure differential/pressure transmitter which Japanese Patent Unexamined Publication No. 4-5532 has disclosed, such a differential pressure/pressure measuring instrument comprises a pressure receiving section for sensing pressure differential and pressure, and a signal converter for converting a signal from the pressure receiving section into an analog signal or a digital signal. A connection between the pressure receiving section and the signal converter conforms to the shape and dimensions specified in standards to assure explosion-proofness entirely.

FIG. 2 shows a typical construction of a conventional pressure measuring instrument. In the figure, a pressure receiving section or pressure sensing block 202 has a pressure sensor or a differential pressure sensor mounted therein. A flange 204 having a pressure input hole 203 for applying a pressure from outside to the sensor is attached through a gasket to the pressure or detector block 202 by screws 205. A tubular connection or junction block 207 is welded to the detector block 202 to transfer signals from the pressure sensing block to a signal converter. A connector and the like to which sensor signals are provided via lead wires are attached on the junction block 207.

A signal converter case 210, which is typically made of cast aluminum, is secured to the junction block 207 by screws 212. The converter case 210 houses an electronic circuit which includes electronic parts for driving the sensors, operationally amplifying sensor signals and converting them into analog signals or digital signals, and an indicator 215 for indicating output data. A cover 216 is threadedly attached to the converter case 210, and the cover has a glass window through which the indicator indicating the analog data can be seen.

The signal converter case 210 typically includes an amplifier block 220 for processing the signals from the detector block and a terminal board box 222 housing a terminal board for receiving power supply from outside and for delivering the power to the amplifier. The analog or digital indicator built in the amplifier block 220 inside the converter case 210 allows the output signal from the detector block to be monitored.

Output signals from the instrument are provided to external high-level control equipment via a cable connected to the instrument through a cable entry thereof.

As described above, a conventional process detection apparatus is essentially made up of three components of the pressure sensing block, the amplifier block and the terminal board box, the latter two of which are included in the signal converter case, and therefore, the entire apparatus is large in size and its construction is complicated. When it is desired that the detector instrument meets with pressure resistance and explosion-proof requirements, its design becomes larger and more complex, thereby having unfavorable influence on its handling. Further, miniaturization has rapidly advanced in electronic components today. Accordingly, there is a need for a compact detector which can be mounted on instrumentation piping in a direct line mount manner so that the operation and maintenance of a plant is carried out in a labor-saving manner.

When a line mount method is employed in an effort to reduce the installation cost at the stage of planning a new plant, detectors themselves must have a structure capable of sufficiently withstanding vibrations and shocks encountered on piping. Because of the large and complicated design, the conventional detectors can not bear such vibrations. A compact design for the detectors not only means less installation space but also contributes to saving of energy and material resources. Further, it is desired that detectors have a structure which facilitates their maintenance.

In commercial plants, the flow rate of a fluid flowing through a pipeline has been conventionally determined as follows. A pressure differential ΔP generated by an orifice disposed in the pipeline is detected by a process detection apparatus. The detector outputs a signal which is received by a signal converter via a two-wire transmission line. The signal converter converts the signal according to a certain function, and transmits the converted signal to high-level control equipment which finally calculates or determines the flow rate. There is a need for a process detection apparatus which has the signal conversion function for flow rate determination that has conventionally been performed by the high-level control equipment, as well as a data indicator function that can tell an operator that what indicated on and outputted from the detector are the data that have already been converted.

Furthermore, there is a need for a process detection apparatus which is provided with an indicator having a function of telling an operator its zero point adjustment state so that the operator can easily perform zero point adjustment on the occasion of maintenance.

SUMMARY OF THE INVENTION

To meet the above needs, a process detection apparatus according to one aspect of the invention comprises a pressure sensing body that has a sensor for sensing the pressure of a fluid in a process, and a signal processing portion that is joined to the pressure sensing body and includes a signal processor circuit for processing signals from the sensor, to output data about the process fluid to outside. The apparatus further features that the signal processing portion is provided with a cable entry for routing a cabling for connection with high-level control equipment and the cable entry is arranged to be variable in its orientation.

A process detection apparatus according to another aspect of the invention comprises a pressure sensing body that has a sensor for sensing the pressure of a fluid in a process, a signal processing portion that is joined to the pressure sensing body and includes a signal processor circuit for processing signals from the sensor, and within the signal processing portion an indicator for indicating data on the process fluid. The apparatus further features that the sensor, the signal processor circuit and the indicator are disposed substantially along the same axis.

A process detection apparatus according to still another aspect of the invention comprises a pressure sensing body that has a sensor for sensing the pressure of a fluid in a process, a signal processing portion that is joined to the pressure sensing body and includes a signal processor circuit for processing signals from the sensor, and within the signal processing portion an indicator for indicating data on the process fluid. The apparatus further features that the indicator is housed in a cover that is provided to seal the signal processing portion, and that the indicator is arranged to be held in the cover even when the cover is opened and closed.

A process detection apparatus according to still another aspect of the invention comprises a pressure sensing body that has a sensor for sensing the pressure of a fluid in a process, a signal processing portion that is joined to the pressure sensing body and includes a signal processor circuit for processing signals from the sensor, an indicator provided in the signal processing portion for indicating data on the process fluid, and a signal output circuit provided in the signal processing portion for outputting the signals from the sensor to outside. The apparatus further features that the indicator presents a first mark meaning that data after conversion are indicated when the indicator gives the data that have already been converted according to a predetermined function by the signal processor circuit and also gives another mark meaning that the data after conversion are outputted when the signal output circuit outputs the data that have already been converted according to the predetermined function.

A process detection apparatus according to still another aspect of the invention comprises a pressure receiving portion that has a sensor for sensing the pressure of a fluid in a process, a signal processing portion that is joined to the pressure receiving portion and includes a signal processor circuit for processing the signals from the sensor, and within the signal processing portion an indicator for indicating the state of the sensor. The apparatus further features that the indicator includes a set of predetermined marks forming a level meter and the indication of the level meter is tuned to the zero point adjustment of the sensor.

Since the process detection apparatus according to the first aspect of the invention allows the orientation of the cable entry on the signal processing portion to be easily changed in a left-right direction and also in a up-down direction, the wiring layout once finished is easily modified later while the entire detector is made compact.

In the detection apparatus according to the second aspect of the invention, the pressure sensing body, the signal processing portion and the indicator are arranged along the same axis, and the detector suffers from no excessive eccentric load because its center of gravity lies in the axis. As a result, the detector can sufficiently bear vibrations and shocks. Furthermore, electrical components can be assembled in a storey-forming manner in the same order as the signal flows therethrough to form the signal flow path along which the signal from the sensor runs to outside, thereby improving the case of assembly and making the apparatus compact.

In the apparatus according to the third aspect of the invention, the cover can be removed from the body of the apparatus while the indicator is kept in the cover. Even if the cover happens to fall during maintenance, the indicator will be protected by the cover not to be damaged. The step of removing the board of the signal processor circuit is simplified, and high reliability and labor saving in maintenance work are achieved.

The process detection apparatus according to the fourth aspect of the invention presents on its indicator marks that indicate that the data output to outside and presented on the indicator are those that have already been converted according to the predetermined function. It is possible for the operator to easily know how the setting of the outputted and indicated data is made in the apparatus.

In the apparatus according to the fifth aspect of the invention, when adjusting the zero point of the sensor, the indication of the level meter varies in synchronism with operator's zero adjustment, and thus the operator easily recognizes how much the adjustment has been in progress.

DETAILED DESCRIPTION

The process detection apparatus according to the invention will be now described with reference to the drawings.

Figure 1:
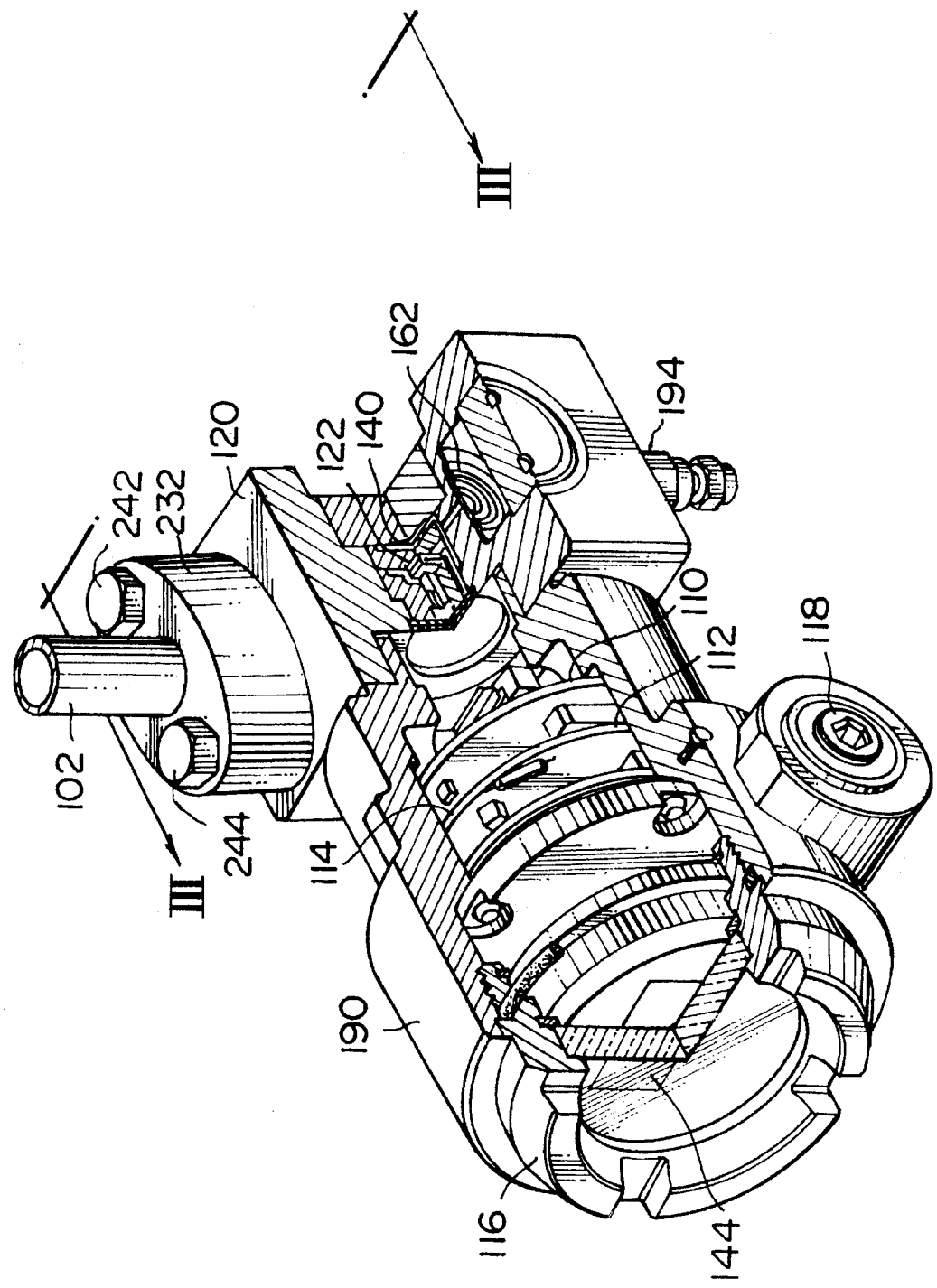
FIG. 1 is a perspective view showing an embodiment of the invention.
Figure 2:
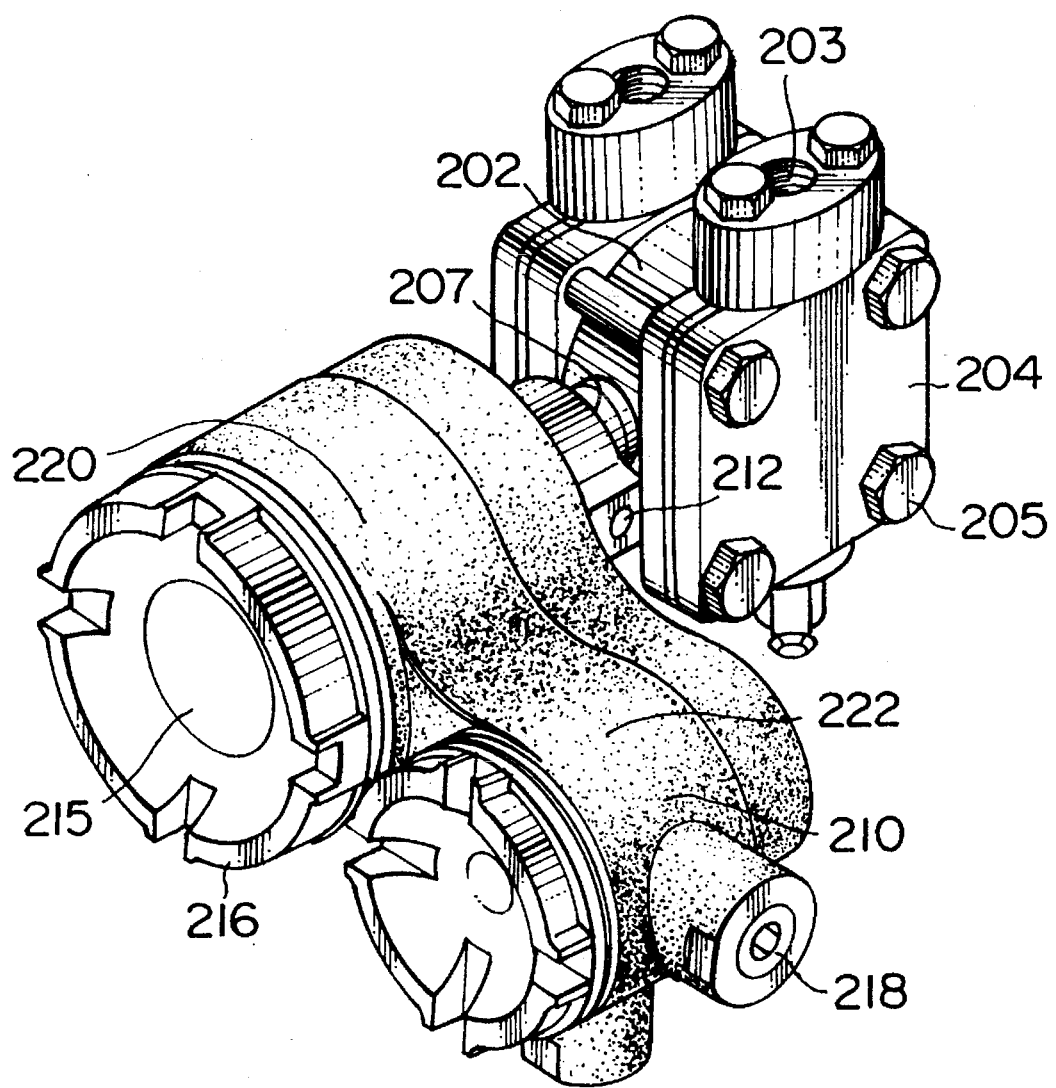
FIG. 2 is a view showing the appearance of a conventional apparatus.
Figure 3:
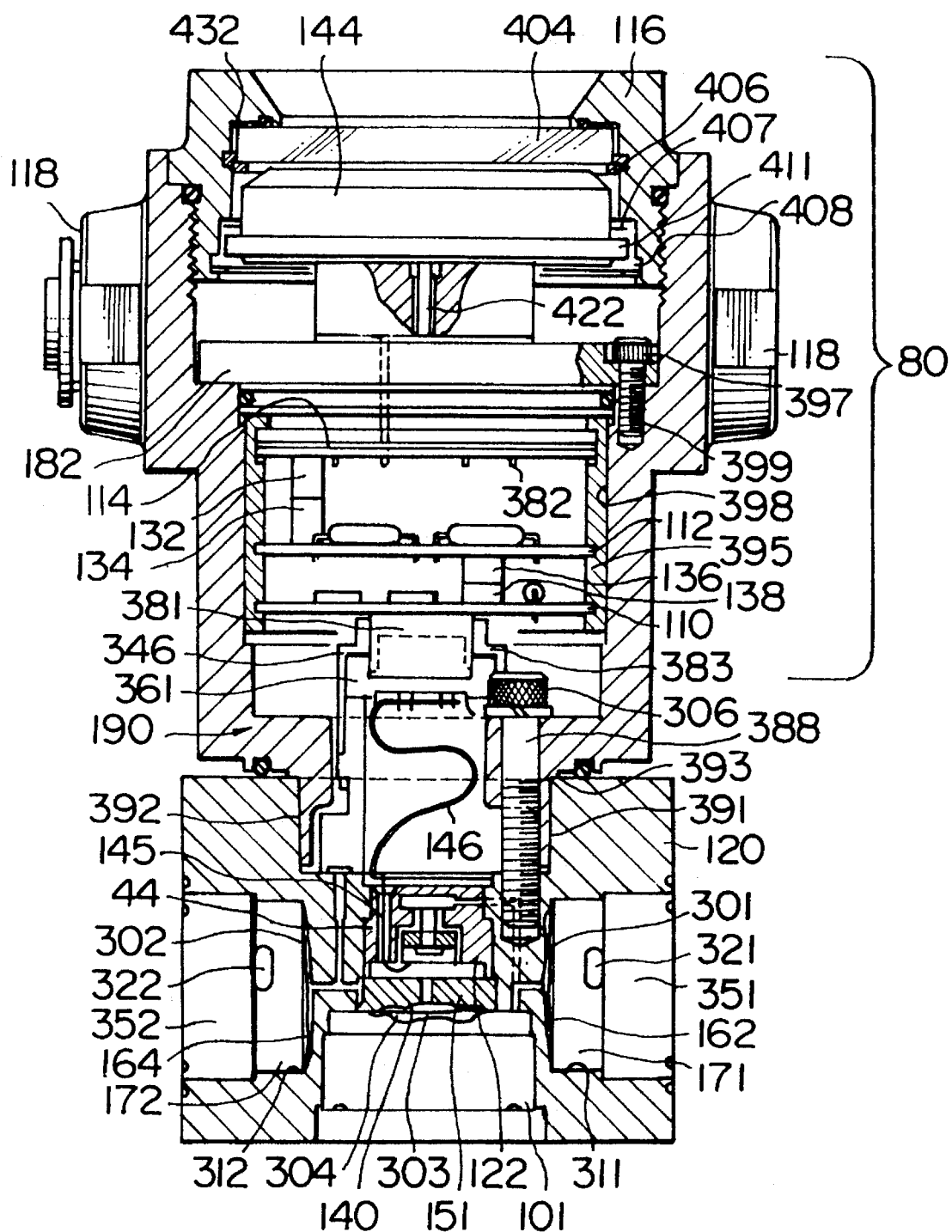
FIG. 3 is a section view showing the entire detection apparatus of FIG. 1.

FIG. 1 is a perspective view showing an embodiment of the pressure differential pressure detector for use as the process detection apparatus according to the invention. FIG. 3 is a plan view of the detector sectioned along the line III—III of FIG. 1.

The pressure/differential pressure detector generally comprises a pressure receiving portion or pressure sensing block 120 to which connected are a piping 102 for the low pressure side of a process fluid and a piping 104 (not shown in FIGS. 1 and 3) for the high pressure side of the process fluid, and a signal processing portion or block 190 having a signal processor circuit for processing signals from a sensor assembly 122.

In the pressure sensing block 120, a fluid pressure of the high-pressure side and that of the low-pressure side are transferred, through a high-pressure seal diaphragm 162 and a low-pressure seal diaphragm 164 respectively, to a non-expansible/compressible liquid (silicone oil) contained therein. These pressures are further transferred to the sensor assembly 122 via a first and second partitions 303, 304 defined by an overload protection diaphragm 140, respectively. A semiconductor composite function type sensor 44 thus detects a pressure differential between the high and low pressures.

A signal from the semiconductor composite function sensor 44 is transmitted to a first circuit board 110 via a flexible printed board FPC146 and connectors 381, 383, then to the circuit on a second circuit board 112, and further to the circuit on a third circuit board 114. Finally, signal information is outputted through a cable routed through a cable connection port 118, for example, as an analog signal of a constant current within a range from 4 to 20 mA, a signal consisting of a digital rectangular pulse signal superimposed on an analog signal of a constant current within a range from 4 to 20 mA, or a digital-converted signal of a constant current. Also, the content of the output signal is displayed in a variety of forms on a dot-matrix LCD140 which is held in a cover 116.

For the convenience of maintenance of the detector a high-pressure side drain tube 194 and a low-pressure side drain tube (not shown) are connected to the pressure sensing block 120 in communication with spaces thereof to which the high-pressure fluid and the low-pressure fluid are transferred, respectively.

The pressure sensing block 120 is provided therein with the sensor assembly 122, the low and high pressure diaphragms 162, 164, the overload protection diaphragm 140, first and second pressure chambers 301, 302, and the first and second partitions 303, 304.

The pressure sensing block 120 is formed of a single material of the SUS standard. Respectively disposed on opposite both sides of the pressure sensing block 120 are holes 311, 312 formed for mounting the seal diaphragms 301, 302 in a symmetric arrangement. The bottoms of the holes 311, 312 are formed with corrugations which are the same in shape as those of the seal diaphragms 301, 302. The openings of the holes 311, 312 are closed by plugs 351, 352.

Figure 7A:
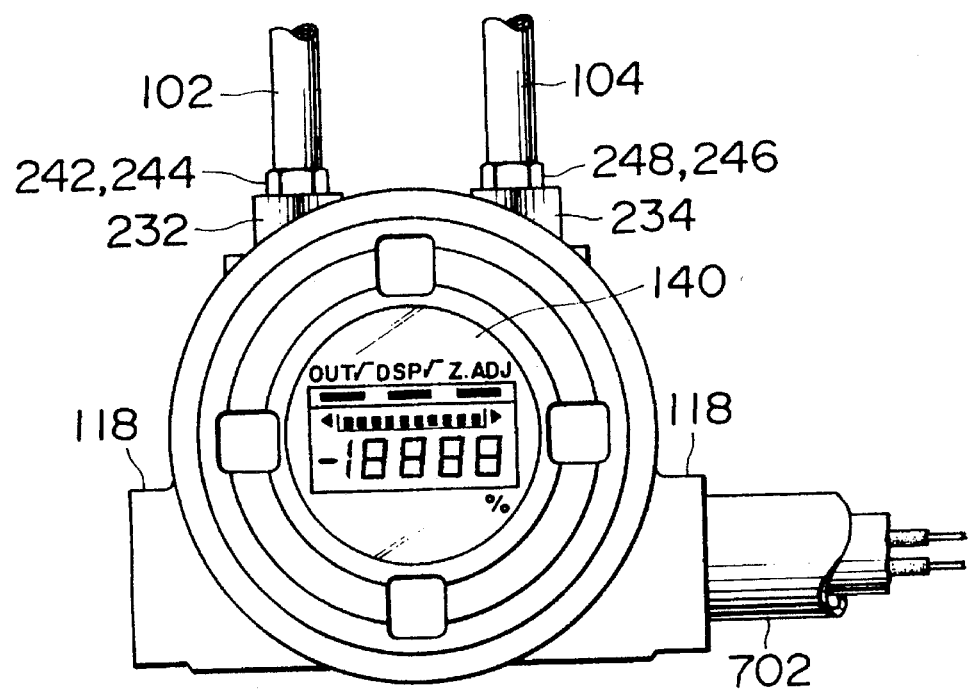
FIGS. 7A and 7B show an example of the connection of the detection apparatus to a transmission cable and to piping for introduction of a pressure.

A taper threaded hole for connection of a pressure introduction piping 104 as shown in FIG. 7A is formed in a portion of the pressure sensing block 120 above the hole 312 that is provided to receive the seal diaphragm 164, and another taper threaded hole is also formed in a connection adapter 234 to receive the piping 104. Thus, the piping 104 is firmly connected to the pressure sensing block 120. Other taper threaded holes are machined in the pressure sensing block 120 at respective positions symmetrical with the hole for the piping 104 interposed therebetween, and the connection adapter 234 is secured onto the pressure sensing block 120 by bolts 248, 246 respectively threaded into the symmetrical holes. Air-tightness is thus ensured between the piping 104 and the pressure sensing block 120. Machined below the hole 312 is a further taper threaded hole to which the drain tube 194 is connected, which hole communicates with the hole 312 via a communicating channel 322.

Similarly, with respect to the hole 311, taper threaded holes are machined in respective portions of the pressure sensing block 120 above and below the hole 311, which holes are for connection of another pressure introduction piping 102 and the low-pressure side drain tube, respectively. They communicate with the hole 311 via a communicating channel 321. Other taper threaded holes are machined to receive bolts 242, 244 so that the piping 102 is secured via an adapter 232 onto the pressure sensing block 120 by bolts 242, 244 and thus air-tightness is ensured between the piping 102 and the pressure sensing block 120.

The pressure sensing block 120 has along its center axis a recess which is formed in a direction perpendicular to the axis of the seal diaphragms 162, 164 to receive the overload protection diaphragm 140 and the sensor assembly 122. Holes 391 for installation of an amplifier are formed in a small-diameter portion of the recess. Formed in a large-diameter portion of the recess is a hole for installation of a fixture 101 for fixing the overload protection diaphragm 140.

The seal diaphragms 162, 164, the overload protection diaphragm 140 and the sensor assembly 122 communicate with each other via pressure introduction channels.

In the embodiment of the process detector, the seal diaphragms 162, 164 are inserted through the holes 311, 312 of the pressure sensing block 120, and the seal diaphragms 162, 164 are welded to the respective holes so that their surfaces are in parallel with each other to define the first and second pressure chambers 301, 302.

Then, the plugs 351, 352 are attached to the associated holes, respectively, so that they are connected to the pressure sensing block 120, to define measurement fluid pressure chambers 171, 172.

The center recess of the pressure sensing block 120 is provided with a step so that the sensor assembly 122 is properly supported by the step when it is inserted from the larger portion of the center recess. The sensor assembly 122 is inserted in such a manner that a communicating path of the sensor assembly 122 is in communication with the communicating path of the pressure sensing block 120, and then the sensor assembly 122 is welded at its both ends.

Subsequently, a center fitting 151 is attached at a position where a communicating path of the center fitting 151 communicates with the communicating path of the pressure sensing block 120, with the surface of the center fitting 151 in the same wavy shape as the overload protection diaphragm 140 faced to the overload protection diaphragm 140. The overload protection diaphragm 140 is welded to the pressure sensing block 120 to define the first partition 304.

Formed in the center of the center fitting 151 is the communication path which transfers pressure from the overload protection diaphragm 140 to the semiconductor sensor 44. The fixture 101 is mounted into the associated hole in a manner that a communicating path of the fixture 101 communicates with the communication path of the pressure sensing block 120 and the surface of the fixture 101 formed in the same wavy shape as the overload protection diaphragm 140 faces the overload protection diaphragm 140. Metal is inserted into a gap between the fixture 101 and the pressure sensing block 120 and metal flow welding is performed to form the second partition 303.

A liquid is filled in a space enclosed by the seal diaphragm 162, the overload protection diaphragm 140, the sensor assembly 122, the communicating paths and a sealing pin of a filler opening. Also, the liquid is filled in another space enclosed by the seal diaphragm 164, the overload protection diaphragm 140, the sensor assembly 122, the communication paths and a sealing pin of another filler opening. In a conventional pressure differential transmitter, to transfer a liquid in a pressure receiving chamber to a partition, a communicating path passing through a sensor set has to be formed to transmit the pressure. In the pressure differential transmitter of this embodiment, however, the first and second pressure chambers are formed near the center diaphragm, so that the quantity of the filler liquid can be small and temperature change of the process fluid can be quickly transferred to the sensor assembly 122. The composite function type sensor 44 can know the state of the process fluid to determine an accurate pressure differential compensated for temperature and static pressure.

Further, in the process detection apparatus according to the invention, even when a transient pressure is applied, either the seal diaphragm 301 or 302 subjected to the excessive pressure is forced to seat on an associated pressure member, and the silicone fluid is prevented from further flowing. And, the quantity of the silicone fluid of either of the pressure chambers is absorbed by the first or second partition 303 or 304, so that any damage of a silicone diaphragm of the composite function type sensor 44 is prevented.

The sensor assembly 122 includes the semiconductor composite function type sensor 44 and hermetically sealed pins 145. FPC146 or a conductor are soldered to a side of the hermetically sealed pins 145 that is open to the atmosphere so that signals from the sensor can be sent to the signal processing circuit.

The measurement fluid pressure chambers 171, 172 are formed inside the pressure sensing block 120, and therefore, flanges and bolts and nuts for the flanges which are needed in the conventional art are not required. Accordingly, the component parts can be reduced and the entire apparatus can be made compact.

Since the process detector according to the invention employs the semiconductor composite function sensor 44, it can measure the pressure (absolute pressure) of the process fluid or a pressure differential between the pressure of the process fluid and the ambient pressure by applying the former to only one of the measurement fluid pressure chambers 171, 172 while the other openings of the detector are closed or open to the ambient pressure. For instance, only the piping 102 or the piping 104 may be connected to a process line to let the pressure fluid into the pressure sensing block. Alternatively, the pressure fluid may be introduced into either of the measurement fluid pressure chambers 171 or 172 from a process tank.

The signal processing block will be now described in detail. The signals from the sensor assembly 122 are sent, via FPC146 and a connector 361, to a first circuit board 110 and a second circuit board 112 where they are processed. Power for driving these printed circuit boards is fed from an outside power supply via a two-wire transmission line passing through either of the cable connection ports 118 disposed symmetrically on the signal processing block 190 and via a terminal board 182 and a third circuit board 114. The terminal board 182 is secured inside the signal processing block 190, which constitutes a converter and is made of SUS or cast aluminum, by means of fixing screws 397 and screw holes 399 which are formed in the signal processing block 190 at 90° pitches.

The above circuit boards are assembled in such a storey-forming or stacked manner that the third circuit board 114 is first soldered onto connection pins 382 provided on the terminal board, and then the first and second printed circuit boards are successively fitted by joining connectors 132 to 134, and 136 to 138. With this arrangement, the terminal board and the first to third circuit boards are connected to one another into one united body along the same center axis as that of the terminal board. As these components thus can be handled or controlled collectively as a board assembly or an amplifier unit, the assembling of them is very easy and the steps of manufacturing can be reduced. When these printed circuit boards are mounted into the case, they are held by a board holder 395 attached to the terminal board 182. The board holder 395 has resiliency at its outer periphery and comes in intimate contact with holes 398 of the case to cause no looseness. Accordingly, the anti-vibration characteristic of the entire amplifier unit is improved.

The first circuit board 110 is provided with a connector 381 for signal connection with the pressure sensing block 120. The connector 381 is designed to be mated with the connector 383 (connected to FPC146).

Figure 9:
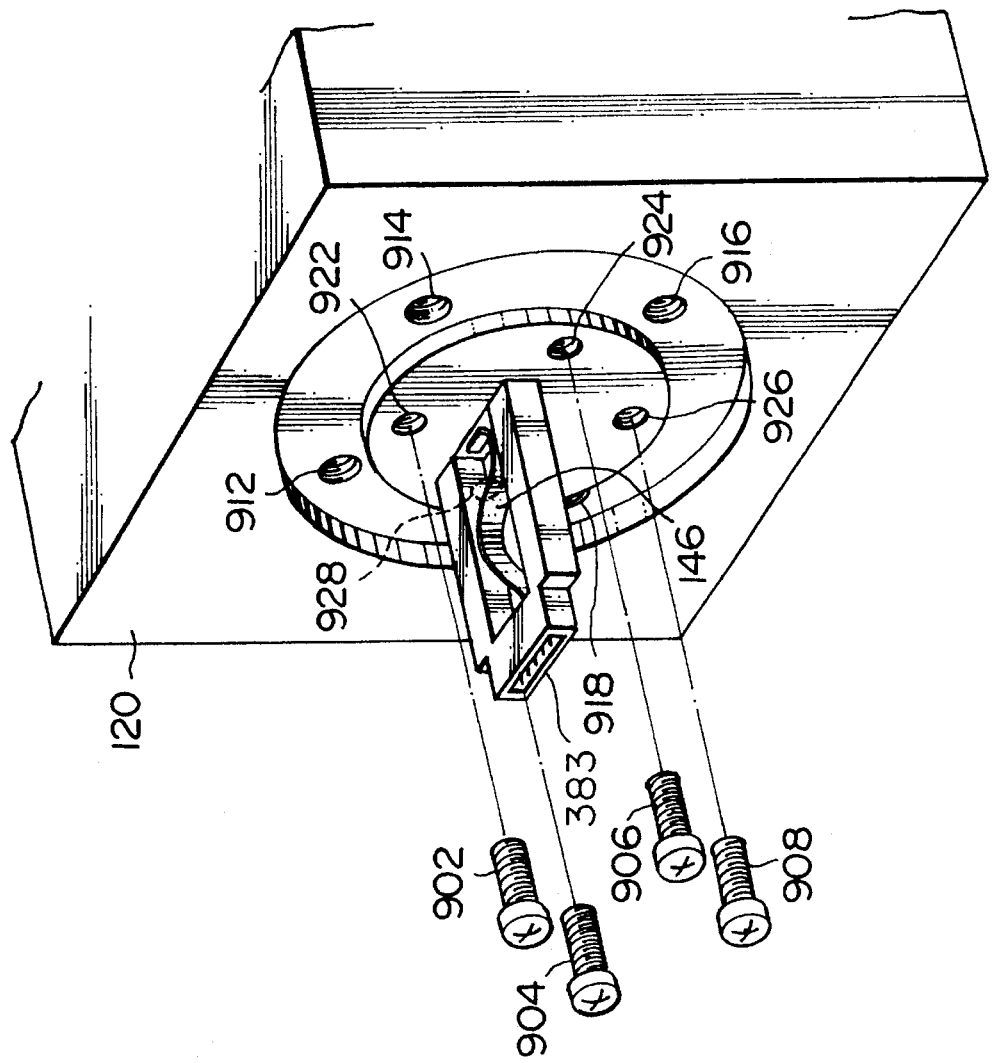
FIG. 9 is a perspective view showing a connection adapter for the pressure receiving portion.

As shown in FIG. 9, the connector 383 is formed of a resin and has a circular surface for connection to the pressure body 120. It forms a connector for the output signal from FPC146 that picks up the signal of the hermetically sealed pins 145. The connector 383 is secured onto the pressure sensing block 120 by means of screws 902, 904, 906, and 908 and screw holes 922, 924, 926, and 928. These screw holes are formed in the pressure sensing block 120 at 90° pitches around the connector 383. The orientation of the connector 383 can be changed at a 90° pitch by varying the combination of the screw holes and the screws.

Figure 6:
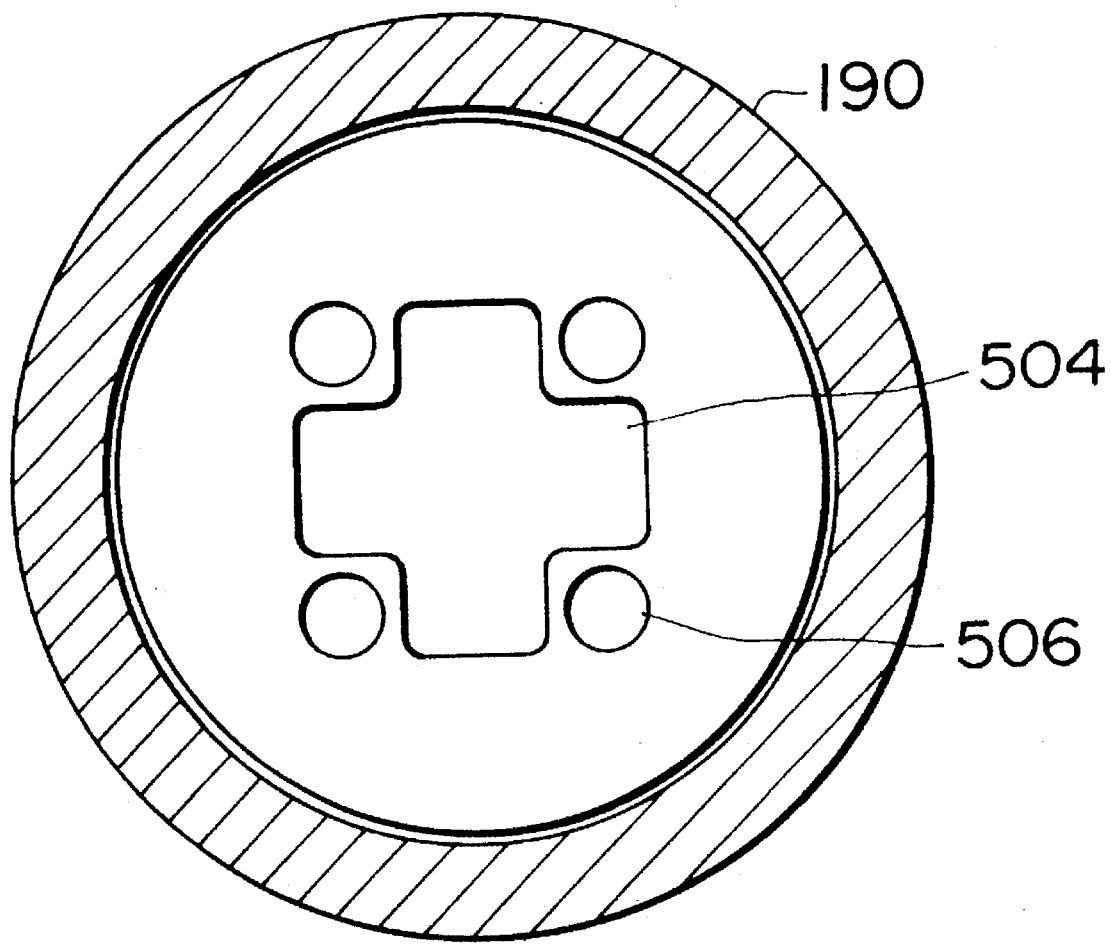
FIG. 6 is a view explanatory of the joint between a signal processing portion and a pressure receiving portion in section taken along the line VI—VI of FIG. 4.

FIG. 6 shows how the connector 381 is mated with the connector 383. A cross-shaped connector guide hole 504 is formed in the bottom portion of the signal processing block 190. The projected connector 383 can be mated with the connector 381 only when it passes through a vertical or horizontal slot of the guide hole. Thus, the guide hole limits the position or posture of the connector 383 for connection to the connector 381 to avoid misorientation of the connector 383 when it is being mated with the connector 381.

Description will be now made on the connection of the signal processing block with the pressure sensing block.

The signal processing block 190 is connected to the pressure sensing block 120 through an outer wall 392 of the block 190, which is formed complementary to a cylindrical recess 391 of the pressure sensing block 120. Four bolts 388 are circumferentially arranged to pass through respective holes 506 which are formed at 90° pitches in the bottom of the signal processing block 190 as shown in FIG. 6, and to be threadedly engaged with respective bolt holes which are formed at 90° pitches in the pressure sensing block 120. The signal processing block 190 is thus firmly attached to the pressure sensing block 120 by means of the bolts 388.

When connected to the pressure sensing block 120, the signal processing block 190 comes in contact with and is held onto the pressure sensing block through a small surface 393 formed on the case 80. This prevents excess force or uneven contact from occurring in the connection between the cylindrical walls 391, 392, and always provides a gap required for explosion-proof capability. Further, even when the converter suffers from vibrations of a large magnitude, the gap between the cylindrical walls is kept constant. The detector is thus free from looseness, and the natural frequency of the signal processing block 190 is not reduced. With the connection described herein, the detector can be used satisfactorily even under severe vibrations (for example, a vibration level of 150 Hz, 3 G).

Description will be now made on the procedure for assembling the terminal board and the circuit boards into the case 80.

With the recess 391 of the pressure sensing block 120 held, the converter of the signal processing block 190 is inserted into the pressure sensing block 120 in a manner that the connector 383 can pass through the connector guide hole 504. Then, bolt holes 506 arranged at 90° pitches in the bottom of the converter are aligned with respective threaded holes 912–918 which are formed at the same pitches in the recess of the pressure sensing block 120. After the orientation is confirmed, the signal processing block 190 is attached to the pressure sensing block 120 by fastening the bolts 388 from above of the case.

Since the connecting portion of the signal processing block 190 can form a connecting surface for explosion-proof in the recess of the pressure sensing block 120, the connection of the signal processing block 190 is made compact and saves material. Further, as the both blocks are joined by means of the bolts inside the signal processing block, the bolts as the connection members are not exposed to outside. This arrangement is preferable in the standpoint of explosion-proofness and improves the environmental resistance and the maintainability.

Subsequently, the terminal board assembled into one united body is inserted into the cylindrical hole 398 of the signal processing block 190 in a predetermined direction (for example, the direction shown by X in FIG. 4). At this time, the signal path the between terminal board assembly and the pressure sensing block 120 is firmly made by securely mating the connectors 382, 381. The distance between the connector of the pressure sensing block and the terminal board is set at a predetermined value so that they are slightly pressed to each other. This arrangement results in improving the rigidity of the first and second circuit boards 110, 112, thereby preventing the natural frequency thereof from lowering.

The signals from the pressure sensing block 120 are sent through the circuit boards and the terminal board to an indicator (dot-matrix LCD) 144 where the output value of the signals is displayed, and/or sent to outside via the two-wired signal and power transmission line. The indicator 144 is screwed to the signal processing block 190 through the cover 116. The cover 116 is provided with a glass or transparent member 404 so that the display of the indicator 144 can be monitored from outside. To satisfy the explosion-proofness requirements, the transparent member is held on the cover through a gasket 432 by spring catches 406. The indicator 144 is mounted in the cover 116 with pressing springs 407 seated on a brim 411 of the indicator 144, and then spring catches 408 are attached to urge the indicator 144 in place. The indicator 144 is received in the cover 116 with some degree of looseness allowed. With this arrangement, the indicator 144 accompanies the cover 116 even when the cover 116 is detached and attached. The indicator 144 does not fall off even when the cover 116 is detached from the signal processing block 190.

Figure 4:
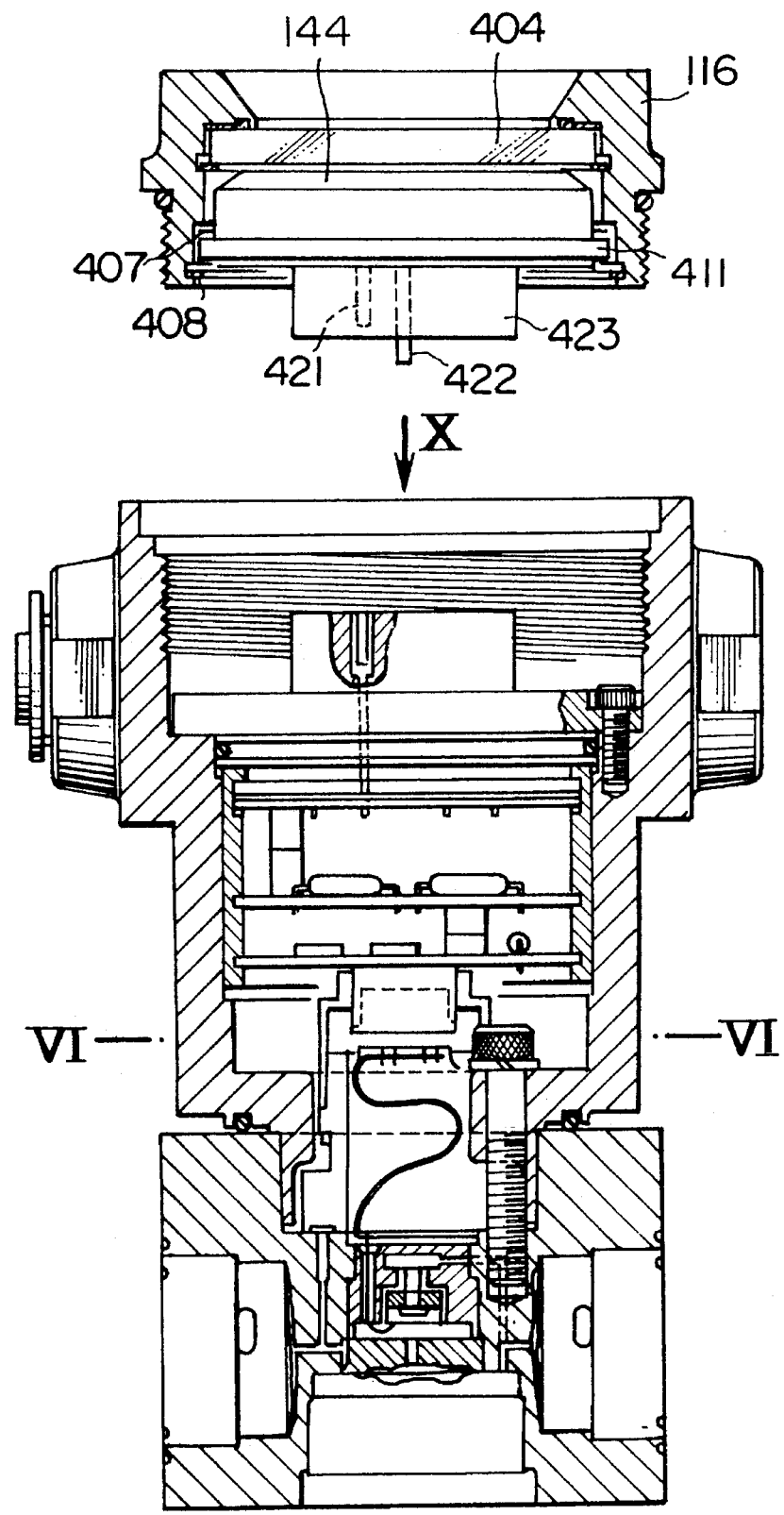
FIG. 4 is a view explanatory of the manner how a cover with an indicator is joined to a case.
Figure 5:
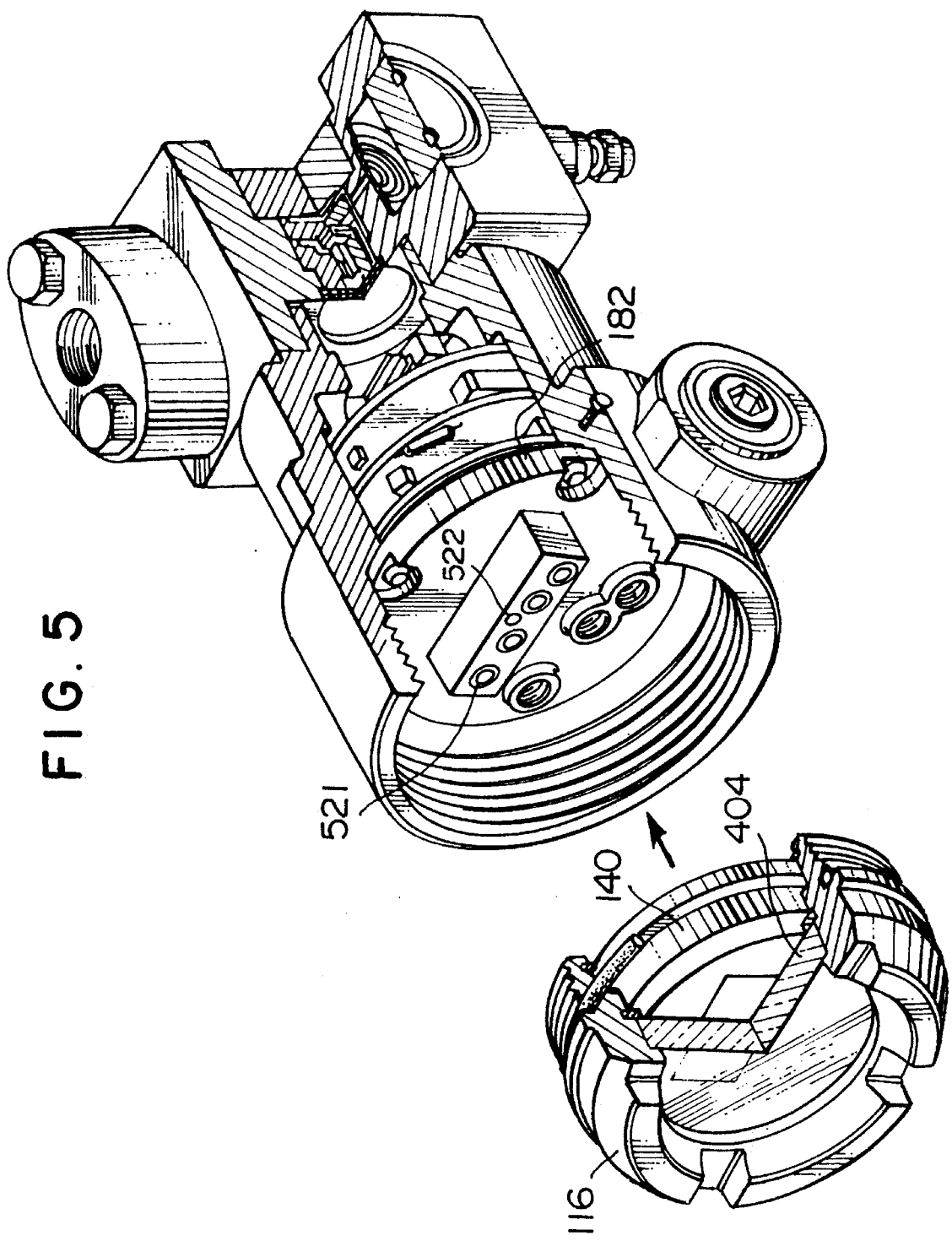
FIG. 5 is a perspective view showing the joining of the cover and the case of FIG. 4.

FIG. 4 is a plan view showing the state in which the cover is in the process of being attached, and FIG. 5 is a perspective view showing that state. The indicator 144 has integrally four terminals 421 for electrical connection and a guide pin 422 for positioning when the cover 116 is being attached. The terminals 421 and the guide pin 422 are enclosed by a cover 423 which is cylindrical to protect them. With this protection, even when the cover 116 is detached, the electrical terminals 421 remain unexposed, and the reliability is sufficiently ensured. When the cover 116 is to be attached onto the signal processing block 190, the terminals and the guide pin are aligned with sockets 521 and a guide pin hole 522 which are provided on the circuit board 182 already received in the signal processing block 190, respectively, and then the cover 116 is threadedly attached into the signal processing block 190. As the indicator 144 is held within the cover 116 with some degree of looseness allowed therebetween, the indicator 144 is rotatable within the cover 116. When the cover 116 is tightly attached after the terminals and the guide pin have been inserted, however, the indicator is fixed with no such rotation allowed. Further, according as the cover 116 is being attached, the indicator 144 comes in contact with the surface of the terminal board and stops while the brim 411 of the indicator is urged by the action of the pressing springs 407. At this time, a space is left between the terminal board 182 and the indicator 144. Within this space, the two-wired transmission line for power supply and signal output is routed.

FIGS. 7A–7B and FIGS. 8A–8D show examples of connecting the process detector of the present invention to the piping and the two-wire transmission line.

As shown in FIG. 7A, generally, in the state that the detector has been connected to the low and high pressure pipings 102, 104, the cable entries 118 lie horizontally with respect to the indicator 144. Accordingly, cabling is possible from either left-hand side or right-hand side. Further, a cable 702 of the two-wire transmission line is employed to send signals to or receive signals from high-level control equipment, and the indicator 144 is faced in the direction in which an operator can readily see necessary information.

Figure 7B:
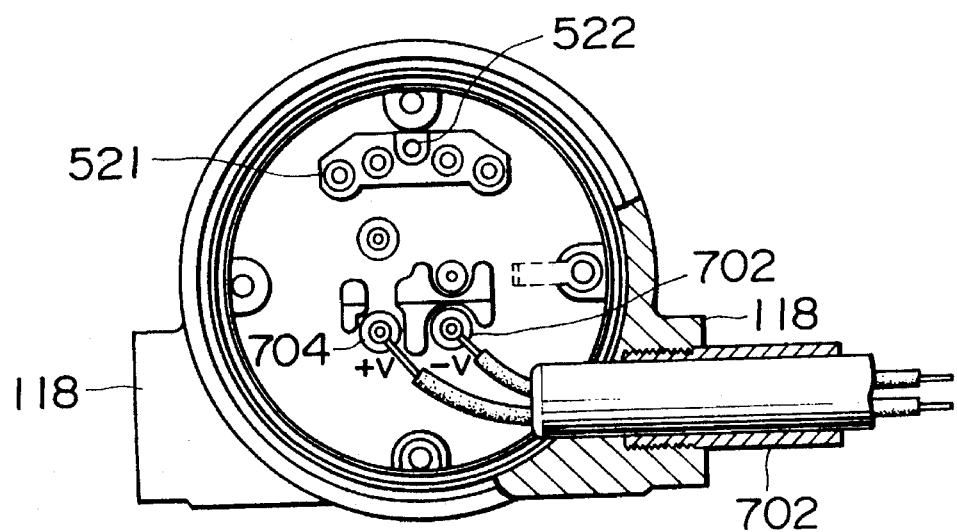

As shown in FIG. 7B, in the process detector of the invention, the direction in which the cable 702 is routed can be changed. For instance, to change the right-hand connection, where the cable 702 is connected from right with respect to the indicator, to the left-hand connection, a cap for the left-hand cable entry is opened, and then wires of the cable are connected to a positive terminal 702 and a negative terminal 704, respectively.

When the connection from above or from below is required for some reason, the bolt holes 506 in the bottom of the signal processing block 190 are turned by 90° or −90° with respect to the screw holes 902–916 in the pressure sensing block 120 to change their combination, and the position of the connector 383 which passes through the guide hole 504 to the connector 381 is changed accordingly. As a result, the direction of cabling can be changed at discretion while keeping the direction of display of the indicator 144 unchanged.

To change the direction of display of the indicator 144, while keeping the position of the signal processing block 190 unchanged, the connector guide hole 504 through which the connectors 383, 381 are passed is turned at 90° pitches, and the connection of the terminal board 182 with the signal processing block 190 is turned accordingly. The direction of display of the indicator 144 is thus changed with the direction of the cable connection unchanged.

The cabling direction and the indication direction can be concurrently changed by combining the changing methods described above.

The process detector according to the invention enables the cabling direction and the indication direction to be changed by changing the relative positions of the pressure sensing block 120 and the signal processing block 190. Accordingly, the change can be made while keeping the pressure sensing block 120 connected to the pipings. Compared to the conventional art, labor and time necessary for the maintenance of the detector of the invention are reduced as small as possible.

Figure 8A:
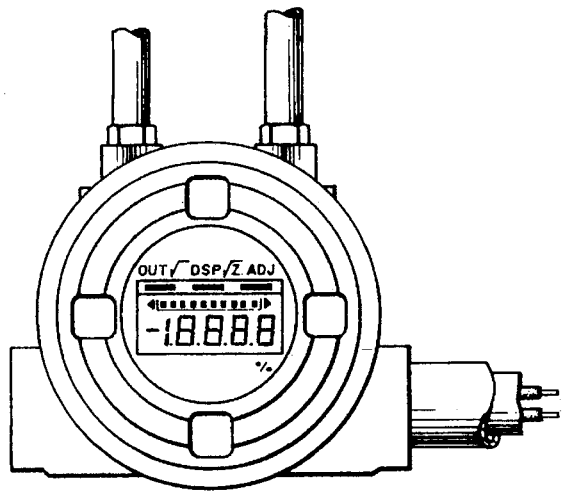
FIGS. 8A through 8D show other examples of the connection of the detection apparatus to a transmission cable and to piping for introduction of a pressure, respectively.
Figure 8B:
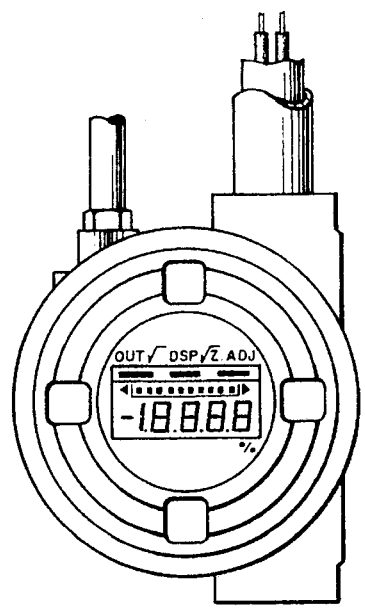
Figure 8C:
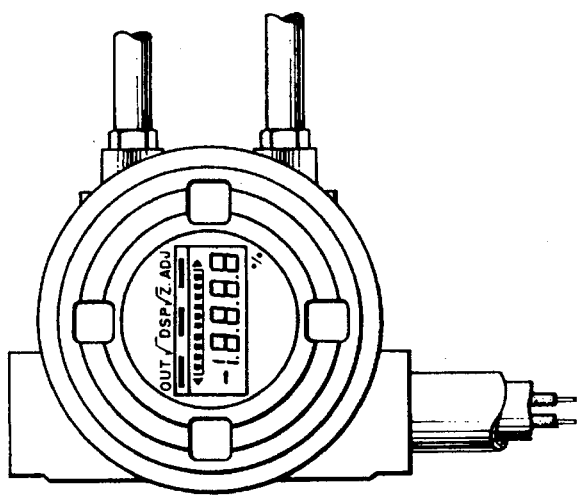
Figure 8D:
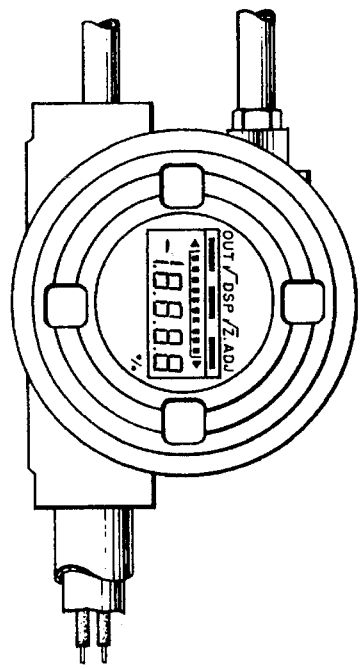

FIG. 8A shows the basic installation configuration. FIG. 8B shows a modification where the cable connection is changed to be made from above. FIG. 8C shows another modification where the indication direction is turned by 90°. FIG. 8D shows still another modification where the indication direction is turned by 90° and the cable connection is made in from below. As the cabling direction and the indication direction can be changed variously, a necessary space for installation of the apparatus can be decreased. Such flexibility available in installation will perfectly work when there is a need for modification in cabling and indication directions in a plant control system even after they have already been established, in order to facilitate the maintenance.

Figure 10:
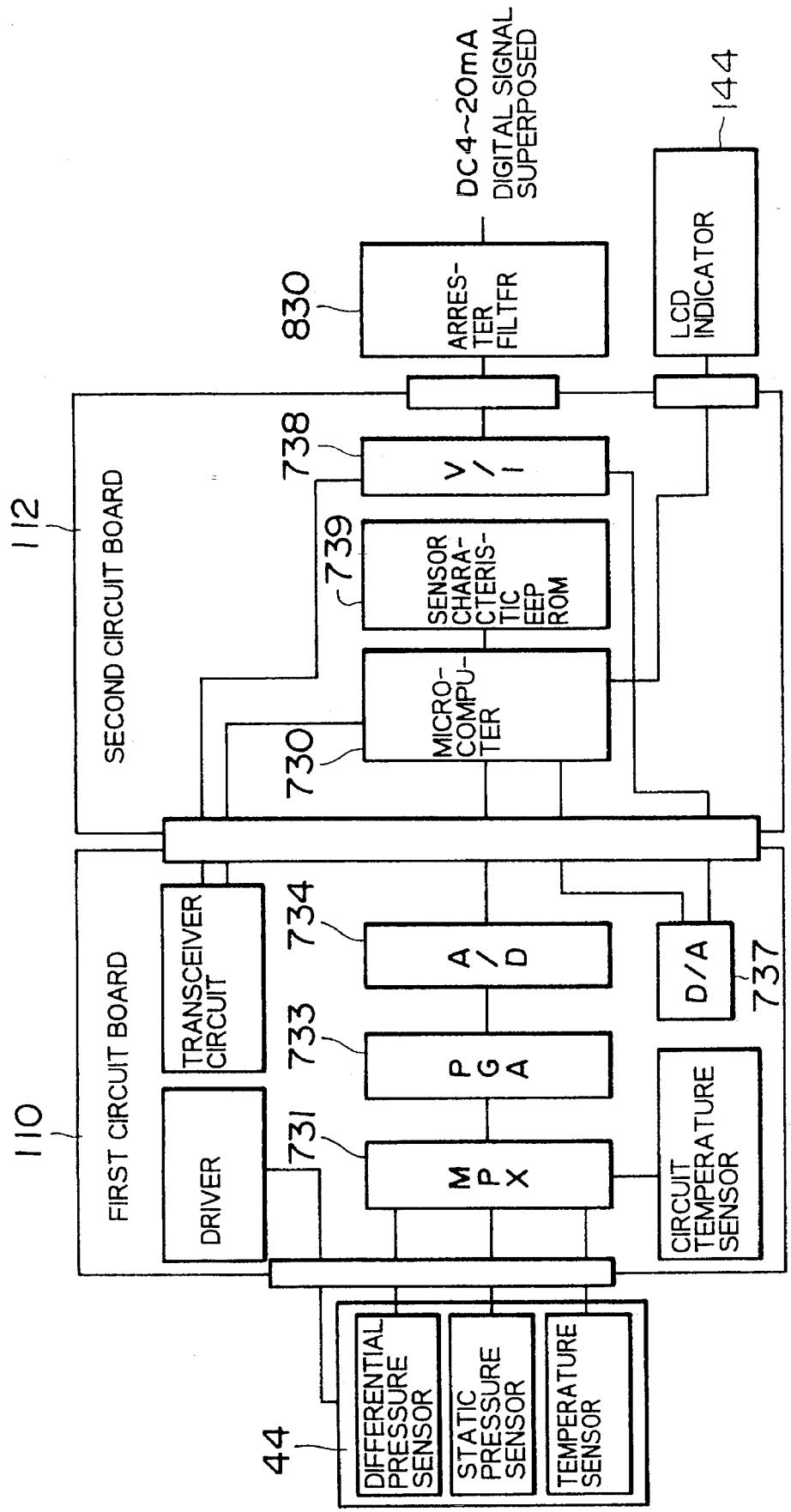
FIG. 10 is a block diagram showing the signal processing system of a converter.

FIG. 10 shows an example of the signal processor circuit of the pressure differential transmitter which embodies the process detector according to the invention. The composite function type sensor 44 senses changes in gage resistances due to pressure differential, static pressure and temperature, and outputs the changes as electrical signals which are selectively received by a multiplexer (MPX) 731.

The signals from the composite function type sensor 44 and the signal from a circuit temperature sensor, which are received and then outputted by the multiplexer 731, are amplified by a programmable gain amplifier (PGA) 733, then analog-to-digital converted by an A/D converter 734, and transmitted to a microprocessor (MPU) 730. A memory 739 (EEPROM) stores the characteristics of a pressure differential sensor, a static pressure sensor and a temperature sensor (in the case of the pressure transmitter, only the characteristics of the pressure sensor and the temperature sensor are sufficient). The microprocessor 730 calculates for compensation using these data of the memory and provides more accurate pressure differential, static pressure and temperature values. The calculation results are converted through a D/A converter 737 and V/I converter 738 to normal analog signals which are in the form of DC current ranging from 4 to 20 mA. The DC current signals are sent to a computer and a signal converter provided in the high-level control equipment to provide the pressure differential, static pressure and temperature signals.

In the embodiment of the process detection apparatus, the data on the process provided by the composite function type sensor 44 is presented on the indicator 144 in the signal processing block 190. The data in the form of digital signals may be superimposed on a DC current ranging 4 to 20 mA to be transmitted. Furthermore, digital data in DC current may be sent from the signal processor circuit to output the process information, though such a signal path is not shown in FIG. 10.

Figure 16:
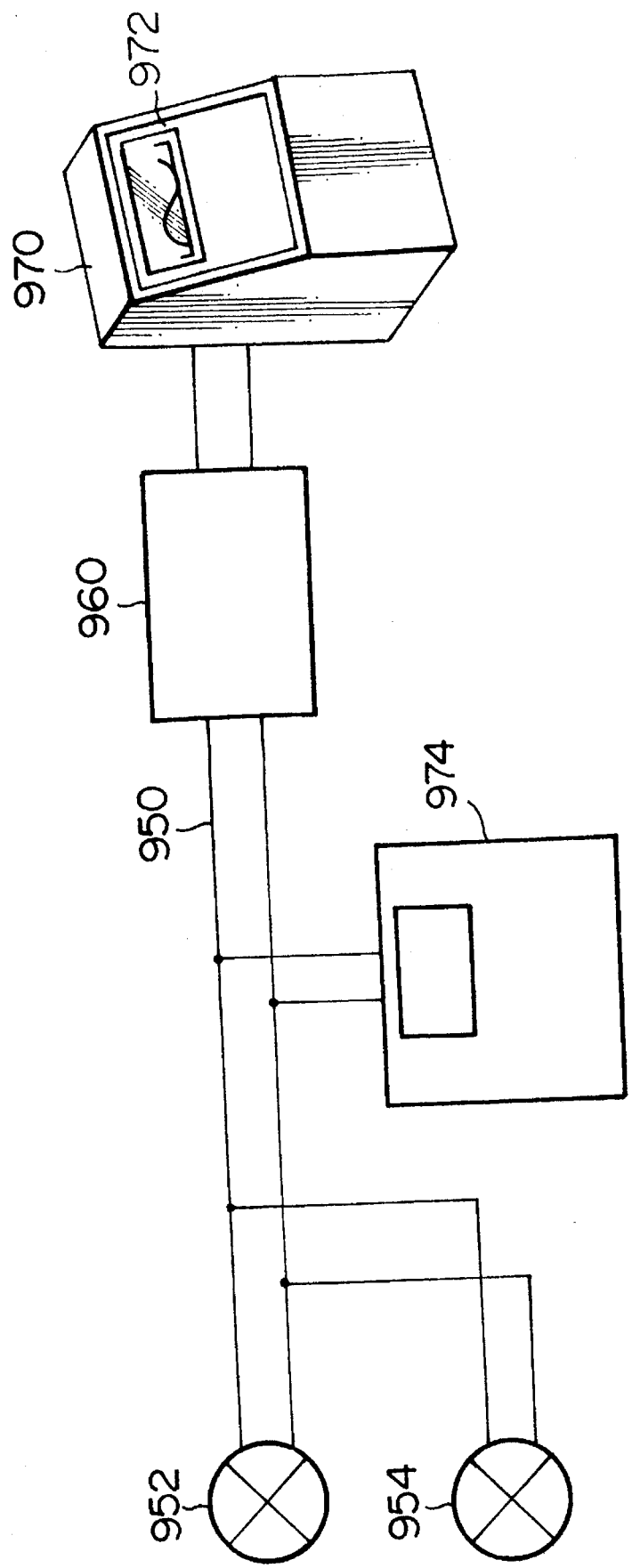
FIG. 16 shows an example of a plant control system in which the present invention is incorporated.

In the communication method where a digital signal is superimposed on a DC current signal or where a digital signal is transmitted to outside to communicate with external control equipment, a digital I/O circuit built in V/I converter 738 allows the data on the process state to be displayed on, for example, an operator's console 972 or a hand-held terminal 974 as shown in FIG. 16. These devices are available to set and modify parameters such as measurement ranges, adjust output levels, monitor input and output, and perform diagnostic tests.

Figure 11:
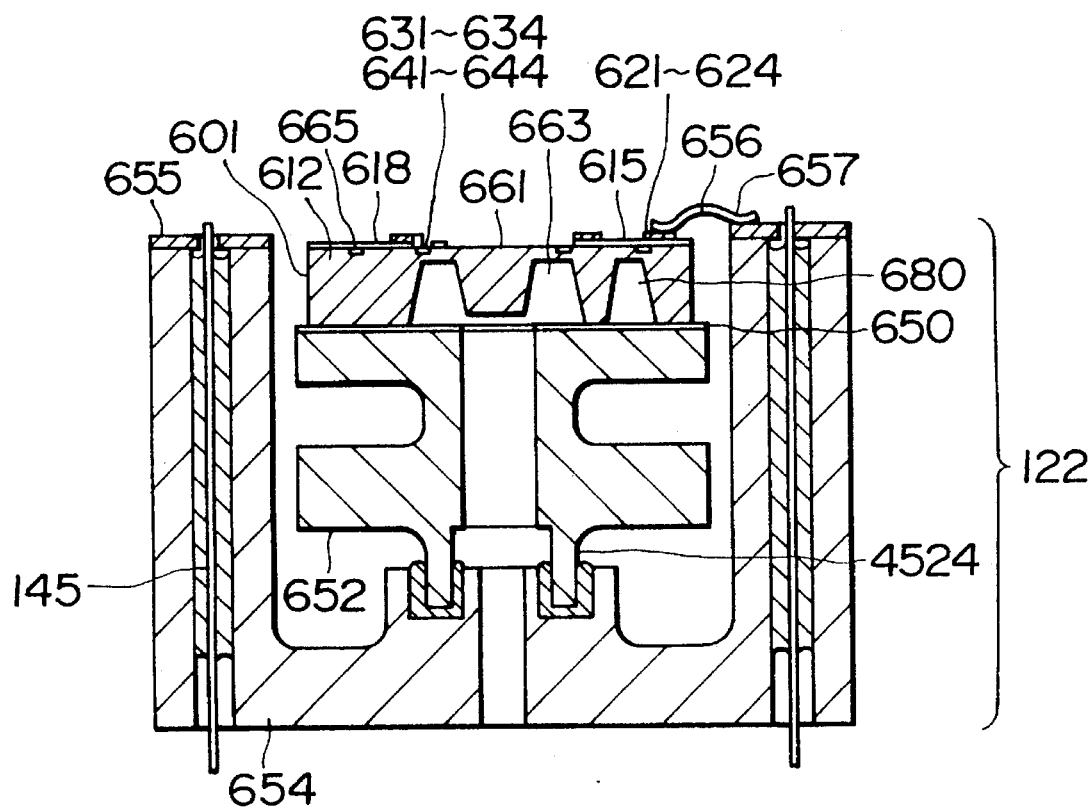
FIG. 11 is a section view showing the structure of a semiconductor composite sensor.

FIG. 11 is a section view showing the composite function type differential pressure sensor used in the process detection apparatus according to the invention.

The composite function type differential pressure sensor chip 44 is a 100 face, n-type single crystal silicon, and it has at the center of its one surface a circular thin portion 661. A first process pressure and a second process pressure are applied to the opposite sides of the thin portion 661, respectively. The thin portion 661 serves as a strain member responsive to pressure differential to act as a pressure sensitive diaphragm for pressure differential detection.

In the direction of <110> axis giving a maximum piezoelectric resistance coefficient along the (100) face on the differential pressure sensitive diaphragm 661, p-type resistor bodies (gage resistance) 631–634 as a first pressure differential sensor and p-type resistor bodies (gage resistance) 641–644 are formed in parallel to or in perpendicular to the crystal axis by means of thermal diffusion or ion plantation. Each of the resistor bodies 631–634 and 641–644 is located near a fixed position where radial and tangential strains caused on the pressure differential sensitive diaphragm 661 under pressure are maximum. These resistor bodies are oriented such that 631 and 641 as well as 633 and 643 are in a radial direction and 632 and 642 as well as 634 and 644 are in a tangential direction. The resistor bodies oriented in the same direction are connected at their one ends and their other ends are connected to a detection terminal to form a bridge circuit.

On a thick portion of the chip other than the pressure differential sensitive diaphragm, resistor bodies 621–624 responsive to static pressure are formed. These resistors are connected to the bridge circuit to provide a large static pressure signal. A resistor body 665 responsive to temperature is also formed on the thick portion, the change in resistance of this resistor is picked up through output terminals, so that the temperature of the process fluid can be indirectly measured.

The pressure differential diaphragm 661 is formed to have desired shape and thickness according to a pressure differential to be detected, by means of anisotropic wet etching or dry etching. With this formation, the resistor bodies 631–634 and 641–644 on the differential pressure sensitive diaphragm 661 are subject to strain occurring thereon, and because their resistances change due to the piezoelectric effect, the change can be detected as electrical signals.

The composite function type differential pressure sensor 44 is mounted on a housing 654 through a hollow stationary base 652. The stationary base 652 is preferably made of ceramic (for example, SiC) that has a coefficient of linear expansion similar to that of silicon, in view of electrical insulation between the housing 654 and the composite function type differential pressure sensor 44 as well as thermal strain due to the difference in coefficient of linear expansion between the stationary base and the housing 654. If such material is not available, however, a difference in coefficient of linear expansion between a material for the stational base and silicon may be ignored when selecting the material. A connection layer 650 is formed on the surface of the stationary base 652 which is to be joined to the sensor 44. The connection layer 650 is formed by grazing the surface of the stationary base 652 with oxidized solder such as low boiling point glass and the like or by applying metallic solder or by providing a thin film of Au-Si alloy or Au by means of sputtering or deposition technique. The connection layer 650 may also be formed of organic or inorganic binder. By forming such a connection layer on the surface of the stationary base 652 that is to be mated with the sensor 44, the sensor 44 is easily joined to the stationary base 652 even at a low temperature. Since the connection layer 650 is thin, it is possible to lessen the affect of strain resulting from the joining as small as possible.

The pressure differential, static pressure and temperature signals from the composite function type differential pressure sensor 44 are transferred via lead wires 656 and a wiring board 655 and outputted to outside from the hermetically sealed terminals 145 which are provided in the housing 654.

The resistor bodies 631–634 and 641–644 on the differential pressure sensitive diaphragm 661 are subject to strain caused by a pressure differential between the top surface of the diaphragm and a recess 663, and their resistance values change due to the piezoelectric effect. Accordingly, electrical signals can be picked up. These resistor bodies 631–634 and 641–644 vary in resistance even when pressures respectively applied to the opposite sides of the diaphragm are equal (a static pressure condition) and even when temperature changes. The former output variation is referred to as zero point variation due to static pressure and the latter output variation is referred to as zero point variation due to temperature change. The zero point variation due to temperature change is mainly attributable to dispersion of the resistance values of the respective resistor bodies 631–634 and 641–644 and to the fact that the resistance value in each resistor body is the function of temperature. The output of the temperature sensor 655 and that of the differential pressure sensor is clearly related to each other, and therefore, compensation for temperature change is easy. The zero point variation due to static pressure is mainly attributable to strain caused on structures other than the sensor chip 44, such as the stationary base 652, the housing 654 and the like, under static pressure. Similarly to the zero point variation due to temperature change, this zero point variation will also be compensated for if the memory 739 stores the relationship data under static pressure between the zero point variation of the differential pressure sensor and the outputs of the static pressure sensors 621–624 and this relationship data is used to compensate for the zero point variation. Accordingly, it is possible to effect highly accurate compensation for variations, including variations in the quantity of liquid inside the detector and variations in the seal diaphragms and the center diaphragm.

FIG. 16 shows an embodiment of the process control system in which the process detection apparatuses according to the invention are connected to high-level control equipment for monitoring and controlling the process state.

An operator's console 970 receives through a signal comparator 960 process state signals detected by process detection apparatuses (pressure differential transmitter or absolute pressure transmitter) 952 and 954 that are connected to a two-wired transmission line 950 in a multidrop manner. An operator can monitor the process state even at a position remote from the processing place. Through the operator's console, the operator can set parameters such as measurement ranges of the process detection apparatus, adjust outputs, and command the detection apparatus to output self diagnostic test results. Through a handheld terminal 974 that is connected to the two-wired transmission line, in the same manner as in the operator's console, the operator can send the same commands to the detection apparatus and receive their results from the detection apparatus.

Although FIG. 16 illustrates the example of the multidrop connection, the process detection apparatus can be connected to a signal comparator 960 in one-to-one correspondence manner.

Figure 12:
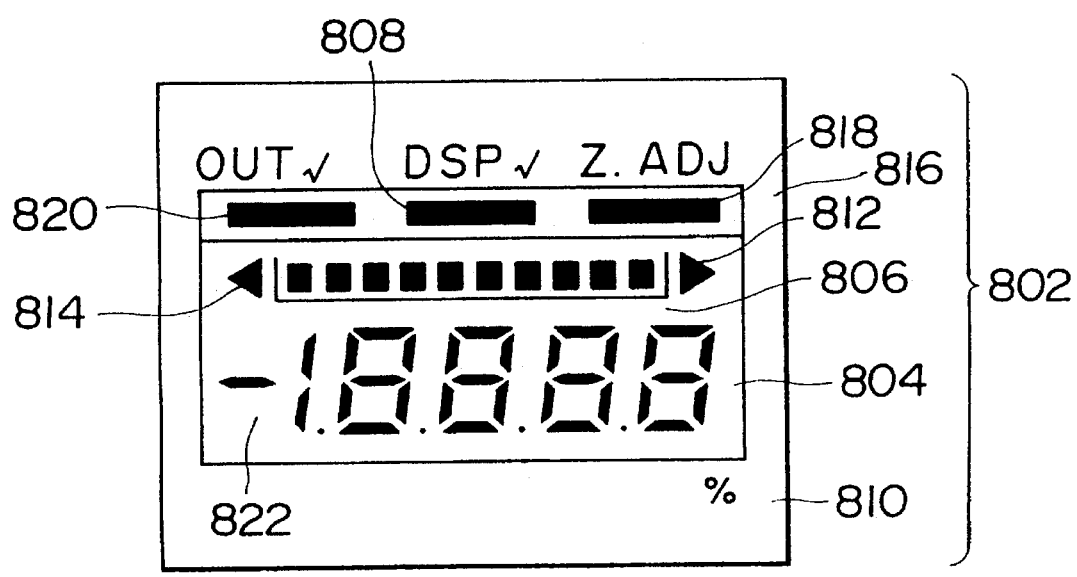
FIG. 12 is an explanatory view of indication sections of the indicator.

FIG. 12 shows indication forming sections of the indicator 144. A display portion 810 is roughly divided into three indication sections. The output of the detection apparatus is presented in figure in an indication section 804, for example, a pressure differential value and an absolute pressure value are presented. Further, displayed on the section 804 are level marks 806 in an analog fashion, which are made of LCD dot matrix corresponding to the figure displayed. When measured data are beyond a maximum range, a too-high mark 812 comes on. When measured data are below a minimum range, a too-low mark 814 comes on. An indication section 816 is available to provide information about the signal output state and zero point adjustment state of the detection apparatus.

Figure 13A:
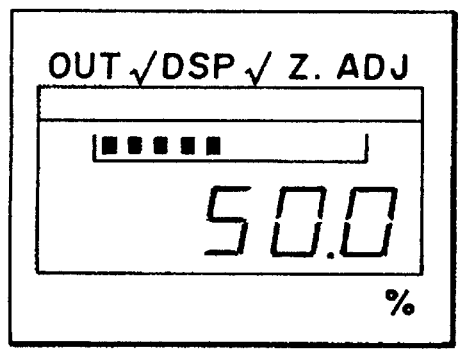
FIGS. 13A through 13C show examples of the display of the indicator, respectively.
Figure 13B:
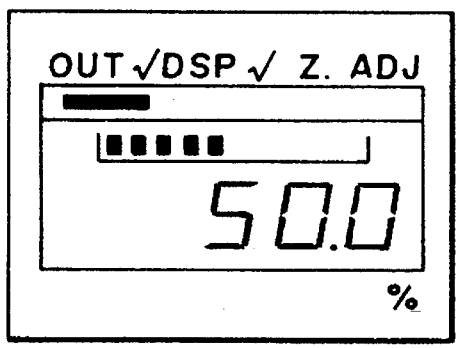
Figure 13C:
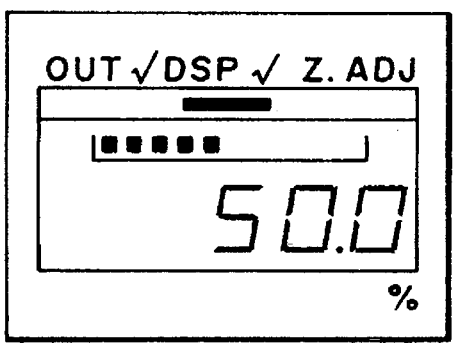

FIGS. 13A through 13C show examples of the signal output state displayed on the indicator 144.

When the process detection apparatus according to the invention is used as a pressure differential transmitter in a commercial plant, its main task is determination of the flow rate of a fluid in a pipeline. To this end, by measuring a pressure differential $\Delta P$ that is generated at an orifice disposed in the pipeline when the fluid passes through the orifice, the flow rate Q is given by the following equation:

$$Q = k\sqrt{\Delta P}$$

where k is a constant determined by Reynolds number and the like.

In a conventional pressure differential transmitter, pressure differential data detected by the sensor of the transmitter are changed linearly into a signal of a constant current ranging 4–20 mA current, and the current signal is transferred via a two-wire transmission line to a signal comparator serving as high-level equipment. The signal comparator square-root converts the pressure differential current signal into a square-root (hereinafter referred to as the symbol $\sqrt{}$) signal which is then sent to an operator's console of high-level control equipment. The operator's console finally determines the flow rate Q.

The pressure differential transmitter according to the invention is provided with a function by which the pressure differential data detected by the sensor within the transmitter is converted into a $\sqrt{}$ signal and the data corresponding to the $\sqrt{}$ signal are sent to the two-wire transmission line. The transmitter of the invention is also provided with another function by which the indicator 144 presents the data before or the data after $\sqrt{}$ conversion depending on setting, along with indication telling an operator whether the data outputted and/or the data displayed are those before or after $\sqrt{}$ conversion.

In FIG. 13A, the indicator 144 indicates that both the data outputted and the data displayed are not converted, by extinguishing both a √ conversion output mark 820 and a √ conversion display mark 808. The reading presented on the section 804 is the data before √ conversion, and in response to the data, the dot matrix marks 806 come on.

In FIG. 13B, the indicator 144 indicates that the data outputted are converted and the data displayed are not converted, by lighting the √ conversion output mark 820 and by extinguishing the √ conversion display mark 808. The reading presented on the section 804 is the linear data from the differential pressure sensor before √ conversion.

In FIG. 13C, the indicator 144 indicates that the data outputted are unconverted linear data and the data displayed are linear converted data, by extinguishing the √ conversion output mark 820 and by lighting the √ conversion display mark 808. The detector thus outputs the unconverted data to outside but displays the converted data on its indicator 144. The section 804 presents the detected data from the differential pressure sensor that have already been √ converted.

The process detection apparatus according to the invention thus allows the operator to monitor its output, output mode and other process data in use collectively on the indicator. The detector of excellent maintainability can be provided.

In the case where a system is formed to include the conventional apparatuses, a signal comparator in the system has to √ convert pressure differential. If the single comparator receives signals from a plurality of detectors, the comparator's subsequent action to high-level equipment is accordingly delayed due to the signal conversion. In contrast, the detection apparatus according to the invention has the built-in function of √ converting the sensor signal. Therefore, even if a large-scale system is constructed, a signal comparator is free from response delay due to signal gathering.

Furthermore, the detector according to the invention offers the display function of indicating whether the displayed data and outputted data are √ converted or not. The operator can thus accurately understand the displayed information.

A hand-held terminal may be connected to a detector of interest in the system via its two-wire transmission line during maintenance work, so that an inspector can easily know whether or not the values before and after conversion indicated on the indicator are equal to those indicated on the hand-held terminal.

During the maintenance, through the hand-held terminal connected, the inspector commands the detector to transmit alternately the converted and unconverted data in order to check that the data indicated on the indicator agrees with the data indicated on the hand-held terminal. In this way, the inspector can verify that the √ conversion function works correctly.

Figure 14A:
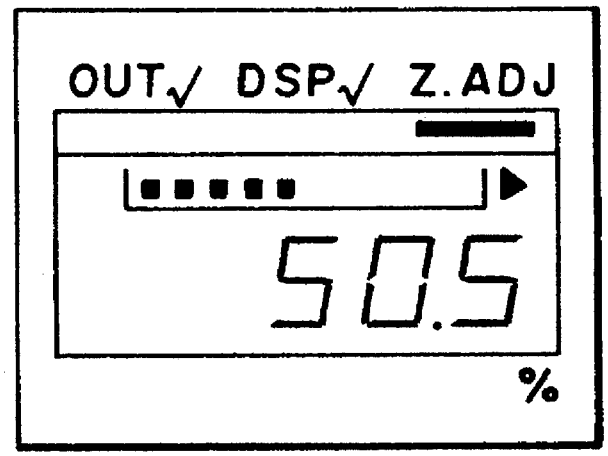
FIGS. 14A and 14B show other examples of the display of the indicator, respectively.
Figure 14B:
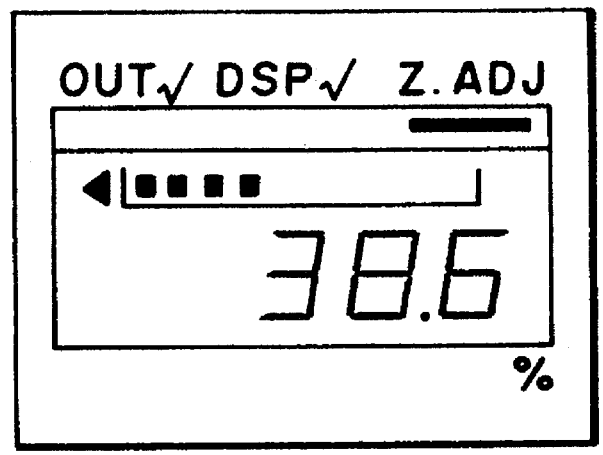

FIGS. 14A and 14B show examples of indication of the indicator 144 when the detector is in the zero point adjustment state. The zero point adjustment state means that, for instance, when the process detector apparatus is used as a pressure differential transmitter in its periodical maintenance, the detector is adjusted until it outputs and indicates 0% data under the condition that a zero pressure differential state is intentionally caused through the operation of a three-way valve connected to the piping for introduction of pressure into the detector. Also, it means that when the process detector apparatus according to the invention is used as an absolute pressure detector connected, for example, to a process tank, the tank is set up to contain fluid at its reference level, and the detector is adjusted until it outputs and indicates data corresponds to the reference level.

FIG. 14A shows the situation where under the state intentionally caused, the zero point of the detector is raised so that the output signal under the state becomes a target signal output percentage. The too-high or over-scale mark 812 is turned on, and dot matrix marks 806 are also lighted corresponding to the value indicated to stimulate raising the level.

FIG. 14B shows the situation where under the state intentionally caused, the zero point is lowered so that the output signal under the state becomes a target signal output percentage. The too-low or under-scale mark 812 is turned on, and dot matrix marks 806 are also lighted corresponding to the value indicated to stimulate lowering the level.

In the zero point adjustment, for example, a hand-held terminal 974 is connected to a detector in need of the adjustment via the associated two-wire transmission line. From the hand-held terminal, the operator can transmit a zero-point adjustment initiating signal, and up and down signals to the detector, and can adjust the detector while looking at the indication on the indicator 144 to verify progress of the adjustment. The zero adjustment is thus performed in an easy and reliable manner.

Figure 15A:
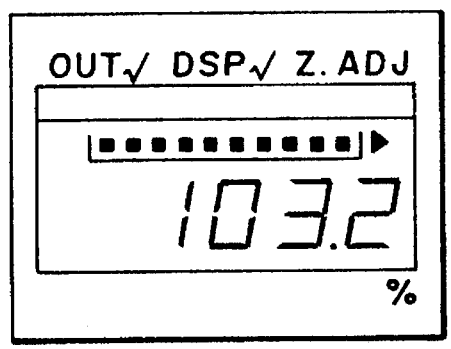
FIGS. 15A through 15C show other examples of the display of the indicator, respectively.
Figure 15B:
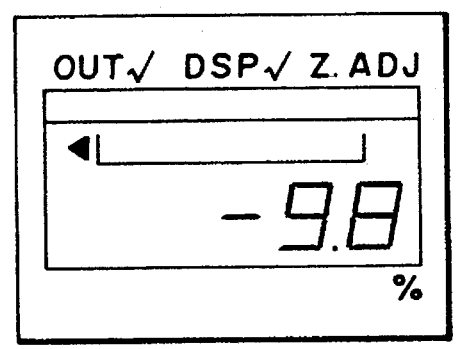
Figure 15C:
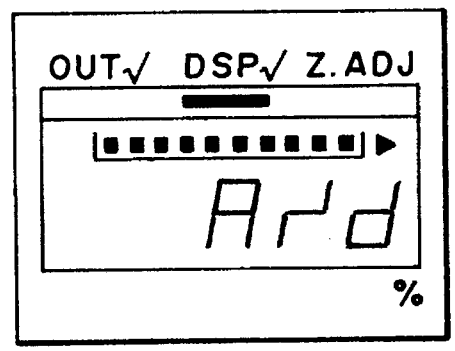

FIGS. 15A through 15C show examples of indication of the indicator 144 when the detector is in abnormal states.

FIG. 15A shows that the output from the detector is too high. The output value is indicated with the too-high mark 812 and dot matrix marks 806 lighted.

FIG. 15B shows that the output from the detector is too low. The output value is indicated with the too-low mark 814 lighted.

FIG. 15C shows that self diagnostic test detects a fault. In this example, the √ conversion display mark 808 is lighted to indicate a portion of the detector where the fault lies. That is, in this example, the indicator tells that the A/D converter is faulty. The detector has a function of stopping its output of the current signal to the two-wire transmission line at the time when any fault is detected in the detector.

As described above, the process detection apparatus of the invention can be made compact as a whole and is thus superior economically. Further, it can be easily replaced and is very easy for use even when its maintenance and examination.

Since the pressure sensing block and the signal processing block are arranged substantially along the same axis, the center of gravity of the detector itself can be set at a position symmetrical with respect to the piping. Thus, no excessive eccentric load is exerted on the detector, and the detector structure is strong enough to withstand strong vibrations.

Even if the indicator falls from the detector during its maintenance, it is protected by the cover and is free from any damage. Furthermore, since the indicator is housed in the cover, removal of printed circuit boards involves less steps.

The indicator has the function of informing the operator that data are indicated and/or outputted after conversion according to a predetermined function. The operator can easily know the state of the apparatus.

In the zero point adjustment during maintenance, the operator easily monitors progress of the adjustment as the indication of shifting direction and level meter reading change in response to adjustment input by the operator.

In summary, the process detector according to the invention is environment resistive, easy to maintain and service, and contributes to reduction in plant installation cost. The detector can be so constructed as to be stable and reliable, can improve running efficiency of a plant and can achieve further elimination or reduction of labor.

What is claimed is:

1. A process detection apparatus for providing data regarding process fluid as an output to an external element, the apparatus comprising:

a pressure sensing body having a sensor sensing a pressure of the process fluid;

a signal processing portion having a signal processor circuit processing a signal from the pressure sensing body; and an indicator provided on the signal processing portion and indicating data regarding the process fluid;

wherein, said sensor, said signal processor circuit and said indicator are arranged substantially along a common axis;

said signal processing portion and said indicator being formed in substantially cylindrical shapes respectively; and said signal processing portion being movably mounted to said pressure sensing body for change of relative positions of said signal processing portion and said pressure sensing body.

2. The apparatus according to claim 1, wherein said signal processing portion has cable entries provided therein for routing cabling for connection of the apparatus with high level control equipment, said cable entries being variable in orientation through a change of the relative positions of said signal processing portion and said pressure sensing body.

3. The apparatus according to claim 2 wherein said indicator is movably mounted to said signal processing portion for change of a relative position thereof to said signal processing portion and said pressure sensing body so that even when the orientation of the cable entries is changed, a direction of indication of the indicator remains unchanged.

4. The apparatus according to claim 1, wherein said signal processing portion is rotatable at 90-degree pitches relative to the pressure sensing body.

5. The apparatus according to claim 1, wherein said pressure sensing body is provided with a recess in which at least a part of the signal processing portion is rotatably received.

6. The apparatus according to claim 5, wherein said signal processing portion has holes formed therethrough and threaded bars passing through the respective holes and engageable with the pressure sensing body so that the pressure sensing body and the signal processing portion are fixedly attached to each other through the threaded bars.

7. The apparatus of claim 1, wherein said signal processing portion has a cover providing sealing and said indicator is received in said cover of the signal processing portion, said indicator being held in the cover during open and close of the cover.

8. The apparatus according to claim 7, wherein said signal processing portion includes at least one board and connector terminals mounted thereon, said indicator is rotatable with respect to the cover and has terminals engageable with the terminals of the signal processing portion so that the indicator is prevented from rotating with respect to the cover with the terminals of the indicator engaged with the terminals of the signal processing portion.

9. The apparatus according to claim 8, wherein when the terminals on the board are mated with the terminals of the indicator, the terminals of earth potential are first mated with one another.

10. The apparatus according to claim 1, wherein said signal processing portion has a substantially cylindrical casing, and said signal processor circuit includes two or more circular boards which are in a shape generally conforming to a cross-sectional shape of the cylindrical casing and are connected to one another in a face-to-face manner.

11. The apparatus according to claim 3, wherein said indicator is rotatable at 90-degree pitches relative to the pressure sensing body.

12. A processing detection apparatus comprising:

a pressure sensing body having a sensor sensing a pressure of a process fluid;

a signal processing portion attached to the pressure sensing body and having a signal processor circuit processing a signal from the pressure sensing body;

an indicator provided on the signal processing portion and numerically indicating data regarding the process fluid; and a signal output circuit transmitting the signal from the sensor to outside;

wherein said indicator is formed to indicate a first mark that represents that the data displayed by the indicator have been converted according to a predetermined function by the signal processor circuit, and said indicator indicates a second mark that represents that the data outputted by the signal output circuit have been converted according to the predetermined function prior to output.

13. The apparatus according to claim 12, wherein the predetermined function is a square-root function.

14. The process detection apparatus of claim 12 wherein said indicator includes therein a level meter made up of a set of predetermined marks, and said level meter is formed to have indicator tuned to a zero point adjustment and to light the marks of the level meter to a middle position when a zero point of the sensor is reached.

* * * * *